L. A. HEWITT.
MONOPLANE.
APPLICATION FILED MAY 25, 1910.
1,000,808.
Patented Aug. 15, 1911.
3 SHEETS—SHEET 1.
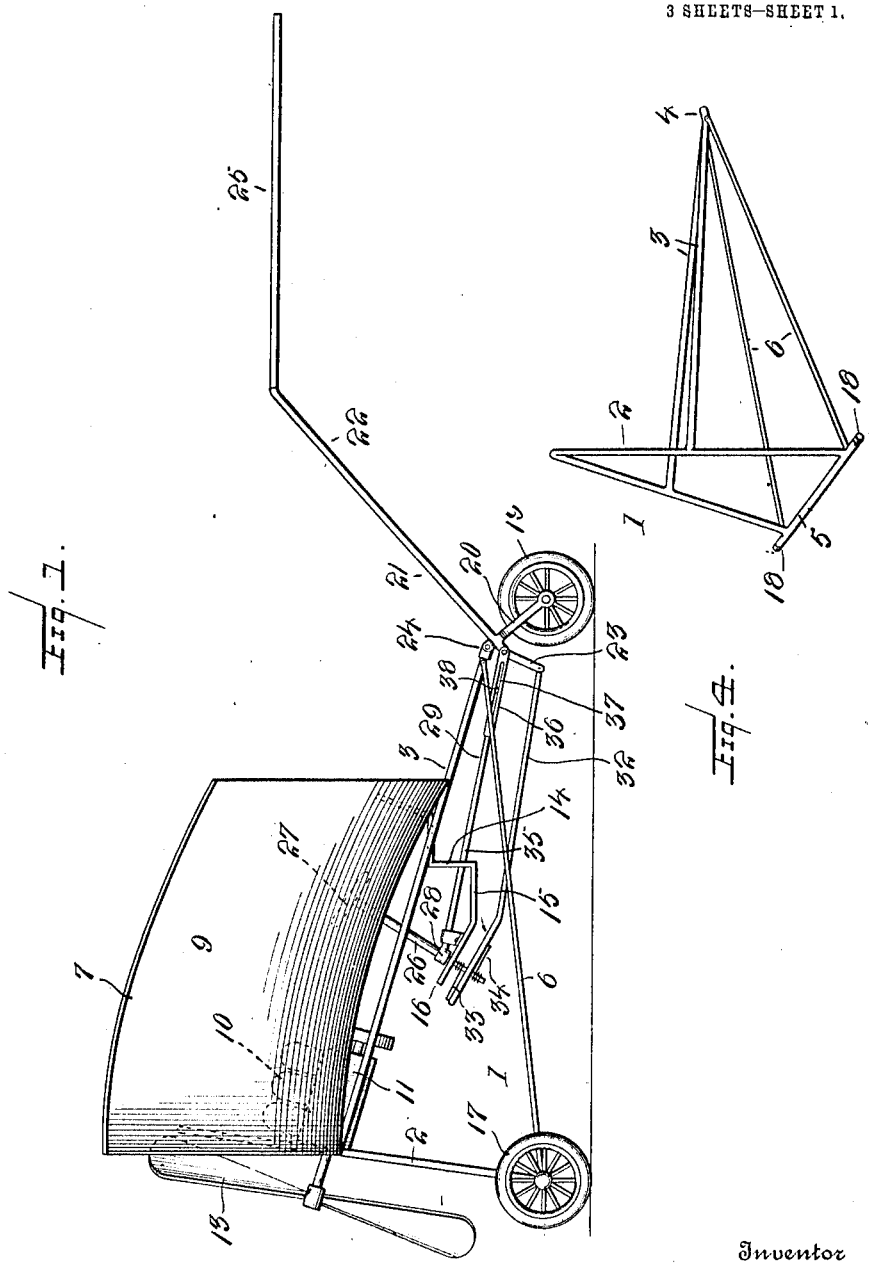
Witnesses
E. R. Ruppert
C. C. Hines
Inventor
Leon A. Hewitt
By Victor J. Evans
Attorney

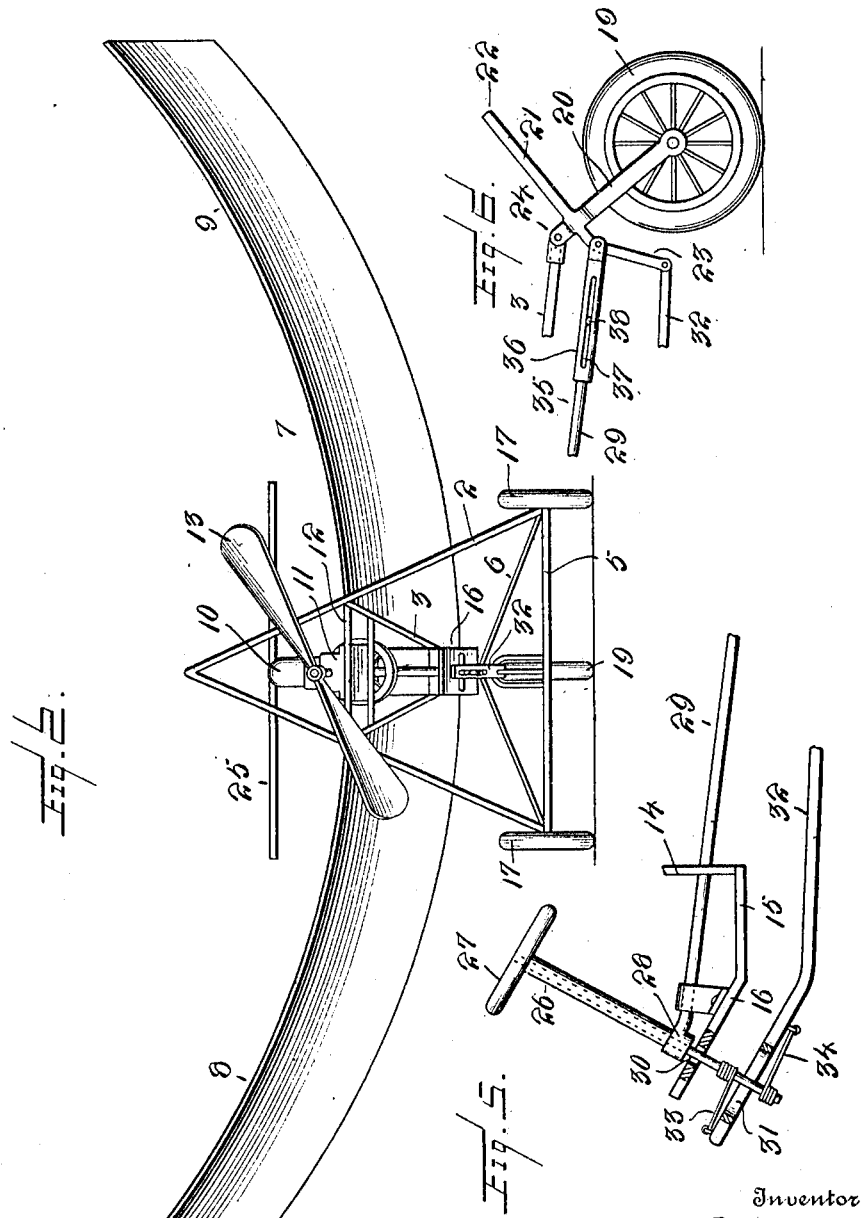

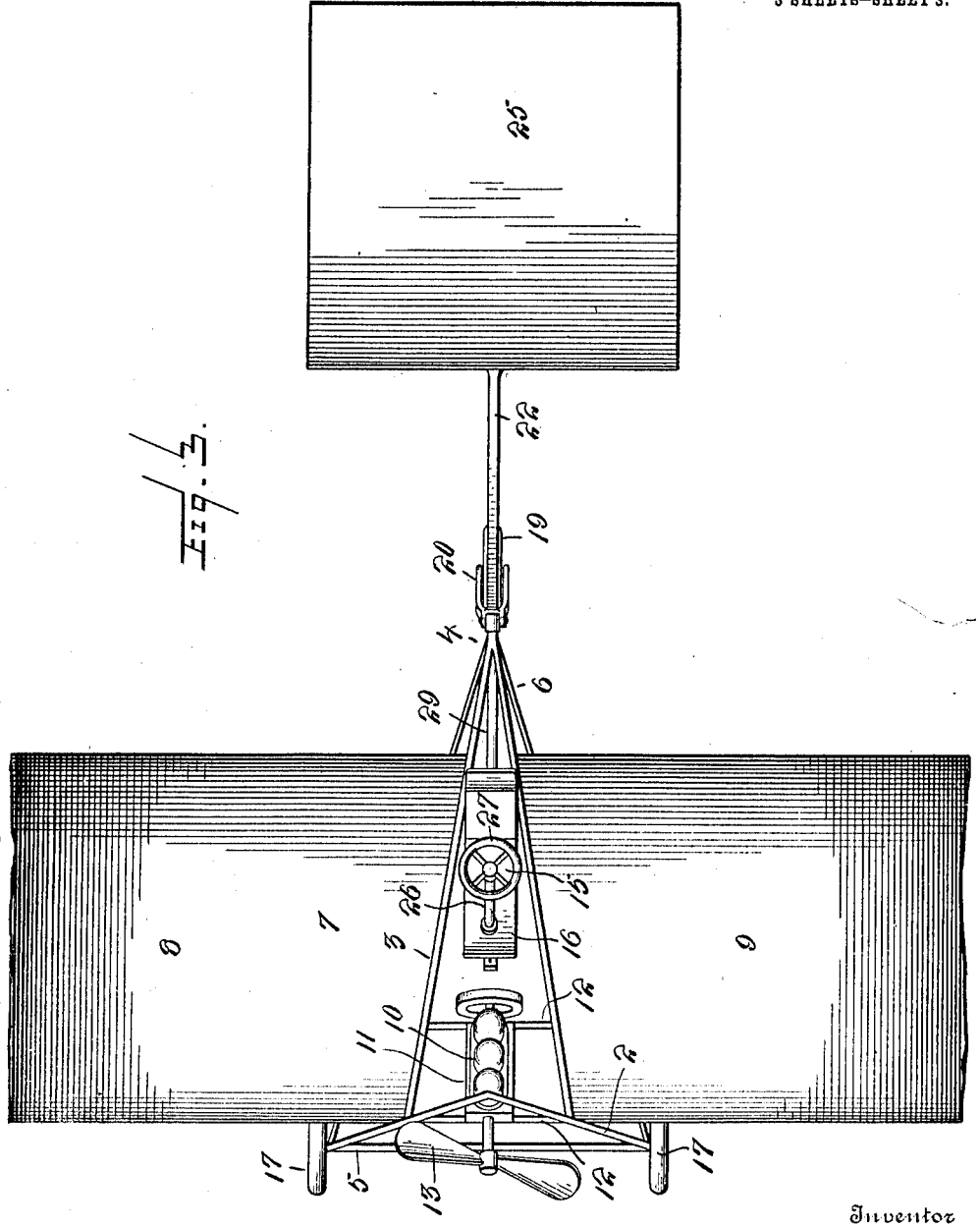

UNITED STATES PATENT OFFICE.

LEON A. HEWITT, OF LIVERMORE, IOWA, ASSIGNOR OF ONE-HALF TO FRANKLIN E. COLLINS, OF LIVERMORE, IOWA.

MONOPLANE.

1,000,808. Specification of Letters Patent. Patented Aug. 15, 1911.

Application filed May 25, 1910. Serial No. 563,329.

*To all whom it may concern:*

Be it known that I, LEON A. HEWITT, a citizen of the United States, residing at Livermore, in the county of Humboldt and State of Iowa, have invented new and useful Improvements in Monoplanes, of which the following is a specification.

This invention relates to monoplane flying machines, the object being to provide a simple construction of machine which will be to a large degree self-balancing and which embodies simple and effective means for vertical and horizontal steering and manual balancing operations.

The invention consists of the features of construction, combination and arrangement of parts, hereinafter more fully described and claimed, reference being had to the accompanying drawings, in which:—

Figure 1 is a view in side elevation of a flying machine constructed in accordance with my invention. Fig. 2 is a front elevation thereof. Fig. 3 is a top plan view. Fig. 4 is a perspective view of the main frame on a reduced scale. Figs. 5 and 6 are detail views of parts of the steering and balancing devices.

Referring to the drawings, 1 designates the main frame of the machine, which comprises an upright inverted V-shaped portion 2, a downwardly and rearwardly inclined V-shaped portion 3, the arms or bars of which are connected at their divergent ends with the arms of the portion 2 and united at their convergent ends or vertex 4. The portion 2 has its arms connected at their lower or divergent ends by a cross bar 5, the ends of which bar are connected with the vertex 4 of the portion 3 by horizontally converging braces 6. The frame thus constructed is composed in effect of an upright triangular portion 2, an upwardly and rearwardly inclined triangular portion 6, the bar 5 forming the base of both triangles, and braces 3 connecting the apex of the triangle 6 with the sides or arms of the triangle 2 below the top of the latter. The braces 6 and superposed arms of the frame portion 3 also form triangles whose bases are formed by the side arms of the portion 6, whereby an extremely simple and yet very strong and durable construction of frame is provided.

The rearwardly converging arms 3 support the flotation plane 7, the oppositely extending wings 8 and 9 of which project longitudinally beyond the opposite sides of the frame at right angles to the line of flight, and are concavo-convexly curved transversely for the dynamical reactions of the currents of air thereon to secure the desired lifting and supporting effect. These wings also curve or incline outwardly and upwardly at a desired radius or angle, so as to adapt them to act upon dihedral-angle principle of opposing counteracting resistances when the machine tilts laterally in one direction or the other to automatically maintain the lateral balance.

The propelling motor 10 is mounted at the upper front portion of the frame upon a bed or platform 11 resting upon and secured to suitable transverse sills 12 extending between the forward ends of the arms of the frame portion 3, the shaft of the motor extending beyond the front of the machine through the frame portion 2 and carrying a suitable tractor propeller 13.

The aviator's seat is secured to and between the arms of the frame portion 3 at a point just in the rear of the vertical transverse center of the frame and is provided with a foot rest 15 disposed below said frame portion and carrying a forwardly projecting shelf 16.

The machine is mounted upon a suitable wheel base comprising, in the present instance, a pair of front wheels 17 journaled upon axle or spindle extensions 18 from the bar 5, and a rear trail wheel 19 carried by a fork or bracket 20 forming the lower normally downwardly and rearwardly inclined arm of a bell crank lever 21, the other arm 22 of which lever is relatively longer than the arm 20 and extends normally at an upward and rearward inclination. The lower end of the lever arm 22 has connected therewith an angularly bent crank member 23 and is universally jointed as at 24, to the vertex 4 of the portion 3 of the frame, whereby the bell crank lever and wheel 19 are adapted to swing both vertically and laterally for guiding and steering operations, as hereinafter described. Mounted upon and projecting rearwardly from the arm 22 of the bell crank lever 21 is a normally horizontal plane 25, which serves as a balancing tail to maintain the fore and aft equilibrium of the machine, as a horizontal rudder for vertical steering and as a tiltable rudder for horizontal steering and lateral balancing.

The means for operating the plane 25 comprises a shaft 26 arranged in advance of the aviator's seat and provided at its upper end with a hand wheel 27. The lower end of the shaft is journaled in a laterally oscillating bearing 28 upon the forward end of a rod 29 and extends downwardly through slots or openings 30 and 31 formed respectively in the inclined shelf 16 and the correspondingly bent forward angular end of a rod 32, which slots or openings respectively permit the shaft to have lateral pivotal motion and the rod 32 to move longitudinally with respect to the shaft. The rear end of the rod 32 is pivotally connected to the crank member 23 while the forward end thereof is connected by cords 33 and 34 with the lower end of the said shaft, said cords being respectively secured to the rods in front and rear of the shaft and reversely wound upon said shaft. Hence, by turning the shaft in one direction one of the cords will be wound and the other unwound to shift the bar forwardly, whereby the bell crank lever will be tilted downward on the joint 24 to depress the plane 25 while a reverse rotary movement of the shaft will unwind the cord 34 and wind the cord 33 to shift the rod rearwardly and thus elevate the plane 25, by means of which the machine may be steered up or down and the fore and aft balance manually controlled.

The rod 29 carrying the oscillating bearing 28 is formed of front and rear sections 35 and 36, the rear section 36 being hollow to receive the front section 35, and being pivotally connected with the crank lever 23 above the point of connection of the rod 32 therewith. The two sections 29 and 36 thus have a telescopic engagement, permitting the section 36 to slide upon the section 35 to compensate for and allow of the swinging movement of the bell crank lever in adjusting the plane 25 vertically. The sides of the sleeve or tubular section 36 are formed with longitudinal slots 37 to receive the ends of a cross pin 38 on the section 35, whereby the sections are held in guided connection and coupled for a lateral turning movement in unison. Hence it will be understood that the plane 25 may be swung vertically by the rotation of the shaft and reciprocating movements of the rod 32 without interference from the rod 29, while the latter may be oscillated laterally by correspondingly tilting the shaft 26 to tilt the plane 25 laterally on the universal joint 24, so that said plane may be shifted at such an angle to the line of travel of the machine to present its greater angle of incidence to the right or left in order that the machine may be laterally steered, laterally balanced and banked in making a turn. Provision is thus made for an effective manual control in balancing and steering the machine in both general directions and banking the machine properly when it traverses a curved path through the use of a single steering rudder, which further serves the function of a tail for preserving the fore and aft balance. It will also be understood that through the connections described the trail wheel 19 which acts as a caster wheel, may be turned to the right or left to steer the vehicle along the surface of the ground in starting and landing.

From the foregoing description, the construction and mode of operation of my improved monoplane machine will be readily understood and it will be seen that it provides a machine which is simple of construction and comprises a minimum number of parts, and which may thus be lightly constructed without sacrifice of strength and controlled in flight in an easy and convenient manner.

Having thus described my invention, I claim:—

1. A flying machine comprising a frame formed of vertical and horizontal triangular portions, said triangular portions having a common base piece, front wheels journaled on said base piece, braces connecting the vertex of the horizontal triangular portion with the arms of the vertical triangular portion below the vertex thereof, a trail wheel, a horizontal balancing and steering plane universally joined with the wheel to the vertex of the horizontal triangular portion, means for vertically swinging and laterally tilting said plane, a supporting plane mounted upon the braces, a motor also mounted upon said braces, and a propeller driven by said motor.

2. A flying machine comprising a frame, a supporting plane carried thereby, a lever universally joined to the rear end of the frame and extending upwardly and rearwardly above the level of the plane, a horizontal rudder carried by said lever, an operating shaft having rotary and lateral swinging movements, a rod pivoted to the lever, cords wound reversely about the shaft and connected with the rod for shifting the same in opposite directions, a connection between the shaft and lever for imparting lateral motion thereto, said connection consisting of telescoping members, and means connecting said members for a relative sliding motion and for lateral movement in unison.

3. A flying machine comprising a frame, a supporting plane thereon, a lever universally joined to the rear end of the frame and extending upwardly and rearwardly beyond the level of the plane, a horizontal rudder carried by said lever, a trail wheel connected with the lever, an operating shaft having rotary and lateral swinging movements, a rod pivoted to the lever, cords wound in opposite directions upon the shaft and connecting the same with the rod, and a connection between the shaft and lever for imparting lateral tilting motion to said lever, said connection comprising telescopic members, one having a pin slidably engaging a slot in the other.

In testimony whereof I affix my signature in presence of two witnesses.

LEON A. HEWITT.

Witnesses:
I. H. ZIGRANG,
C. KINLUND.